UNITED STATES PATENT OFFICE 2,595,957

POLYVINYL ACETATE EMULSION CONTAINING AN AROMATIC AMIDE, AND A BASE COATED THEREWITH

Walter G. Kunze and Raymond Bertram Evans, Catonsville, Md., assignors to Le Page's Inc., Gloucester, Mass., a corporation of Massachusetts No Drawing. Application April 6, 1950, Serial No. 154,430

6 Claims. (Cl. 260—29.6)

This invention relates to emulsions of polymers which are suitable for use as coatings and as adhesives. It is particularly concerned with such an emulsion of polymers which is capable of providing a water-resistant bond or coating and which at the same time retains the stability, fluidity and the various other physical properties of such an emulsion which make it particularly useful as a coating or adhesive.

The use of melts and solutions of water insoluble artificial resins in the coating and adhesive art has been supplanted to a large extent by emulsions of such resins, particularly polyvinyl acetate emulsions, due to the improved ease, economy and safety with which aqueous emulsions of the resin may be employed. On the other hand, the usefulness of water insoluble polymer emulsions has been limited by the characteristic lack of water-resistance of the coatings and bonds deposited therefrom at room temperature and the tendency of such coatings and bonds to re-emulsify or disintegrate when subsequently brought into contact with water during the course of normal use of the object or article to which they have been applied.

This lack of water-resistance has been considered inate in the coatings and films deposited from such polymer emulsions inasmuch as water-soluble emulsifying and bodying agents are employed necessarily to establish and stabilize the emulsion. These agents are apparently carried into the film or bond deposited from the emulsion upon application of the emulsion to a surface, and actively exhibit the emulsifying effect on the polymer comprising the body of the coating or film and cause its redispersion when the surface is brought into contact with water.

Various proposals have been made to obviate the water-sensitivity of the coating or bond deposited from such emulsions, but in general these proposals have been directed to modifying emulsions of such polymers which have been prepared in a specific manner, or require treating the emulsion with certain diluents immediately prior to its application due to the recognized tendency of the suggested diluents to either break or gel the emulsion shortly after the addition of the diluent.

Prior to the instant invention, for example, a common expedient for increasing the water-resistance of a coating or film deposited from a water-insoluble polymer emulsion included the addition of a quantity of one or more substances such as dimethylol urea, trimethylol melamine, certain chromium salts, strong acids or highly reactive aldehydes such as glyoxal, certain resins, toluene and peroxides. In most instances it was required that the substances be added to the polymer emulsion immediately prior to use as the resulting compositions were unstable and certain of the substances resulted in a progressive increase in the viscosity of the emulsion until a gel was formed. Gelling rendered the composition unfit for use in adhesive applicator machines operated at high speed. Additionally, the modification effected by some of these substances did not result in a substantial improvement in the water-resistance of the coating or film deposited from the emulsion, and often imparted undesirable color and foaming characteristics to the emulsion.

Where thermo-plastic polymeric material has been employed, it has been suggested that the water-resistance of the coating or bond deposited from an emulsion of the material can be improved by heating the coating or bond sufficiently to cause coalescence of the material into a homogeneous mass. This procedure is obviously not suitable where the emulsion is employed as a quick-setting adhesive in high-speed mechanical applicators, and in any event the drying and heating suggested is often impractical.

A further suggestion directed to retaining the advantages of working with the polymers in an aqueous medium and at the same time avoiding the inherent disadvantages of water-sensitivity of the coatings or films deposited therefrom required dispersing the polymer as extremely small particles. The coatings or films deposited from such emulsions do exhibit a satisfactory water-resistance but due to the fine particle size which imparts the water-resistance, the emulsions do not have the tack necessary to make them useful as quick-setting adhesives.

It is an object of this invention to provide a composition comprising an aqueous emulsion of a polymer, particularly a polymer of vinyl acetate, alone or in combination with small quantities of other monomers, which is stable throughout long periods of storage and which when employed as a coating or an adhesive will deposit a coating or bond which is water-resistant. A further object of the invention is to provide a process which is generally applicable to modify emulsions of polymers, particularly polyvinyl acetate, which have been polymerized to different extents, or in different manners, and which include various combinations of plasticizers and other diluents commonly employed to develop favored characteristics in the films or coatings deposited from such emulsions.

We have discovered that the water-resistance of coatings or bonds deposited from an aqueous emulsion of polymers, particularly polyvinyl acetate emulsions, which are formulated, or modified, to have a tackiness rendering them suitable for use as quick-setting adhesives, can be established by additions of certain organic compounds within specific limits. These active compounds are characterized by a particular balance between the parts of the monomeric molecule, one part of which is hydrophilic or polar in nature, and the other part of which is hydrophobic or non-polar. The effectiveness of the compounds in producing water-resistance in the coatings or bonds deposited from such emulsions is apparently due to the presence of both the polar and non-polar groups within the molecule in the prescribed balance. The active compounds exhibit solubility, to various extents, in both water and in organic solvents such as mineral spirits, petroleum ether, toluene, castor oil, etc. This solubility in both water and organic solvents apparently is due to the dual hydrophilic-hydrophobic nature of the compound. As it has been generally recognized that the presence of water-soluble emulsifiers carried into the bonds and coatings deposited from emulsions of water-insoluble polymers may later cause redispersion and disintegration of the bonds and coatings, it was particularly surprising to find that incorporating into the emulsion additional compounds which are water-soluble to some extent themselves will nullify the effect of the water-soluble emulsifiers and thereby impart water-resistance to the coatings and films deposited from such emulsions.

For present purposes a polar or hydrophilic group or radical may be considered to be one which has a strong affinity for water and which when combined in compounds in which it is the dominant functional group will cause the resulting compound to be immiscible, or miscible to a limited extent, in oil-type solvents. A non-polar or hydrophobic group, on the other hand, may be considered to be one which has slight affinity for water and a strong affinity for oil-type solvents. In general, the amide group exhibits the characteristics required of a polar group. An aryl radical such as the benzyl group is a suitable non-polar group. As indicated by the foregoing principles, it has been found that the aromatic amides having 7 carbon atoms are effective in imparting water-resistance to the coatings and bonds deposited from polyvinyl acetate emulsions in which they are incorporated in the quantities and manner hereafter prescribed. Benzamide, for example, has a molecule in which the benzene nucleus and a side chain which comprises one carbon atom, effectively balances the functional amide group of the side chain to establish the requisite polar-non-polar balance.

The number of carbon atoms in the active compounds rather than their isomeric arrangement appears to be determinative of the degree of non-polarity of that portion of the compound, as where isomers exist they are all equally active.

The necessity for the prescribed polar-non-polar balance, and the effectiveness of the benzene nucleus in establishing such balance, appears from the fact that formamide and acetamide are entirely too hydrophilic in nature to be active in imparting water-resistance, reflecting the dominance of the polar amide group, whereas benzamide is active, as previously stated.

The preferred range of quantities of one or more of the active compounds by weight with respect to the solid content of the polyvinyl acetate emulsion has been found to be between about 5-15%, the optimum amount in a particular instance depending upon the initial water-resistance characteristics of the starting material emulsion, the amount of plasticizers employed, and the age of the starting material emulsion. In the case of the normally solid amides, the solubility of the active compound is the limiting factor on the amount of compound which can be employed. In general, more than 15% by weight of solid content of the starting material emulsion will tend to crystallize out. When the active compound is normally a solid it is dissolved to obtain an effective concentration and the solution thus formed is mixed with the starting material emulsion.

The physical properties of a polyvinyl acetate emulsion such as the viscosity of the emulsion, and the tensile strength, flexibility and heat sealing temperature of the film or bond deposited from the emulsion are determined in a large part by the degree of polymerization of the vinyl acetate monomer. A higher degree of polymerization results in increased bond strength, a higher heat sealing temperature and a somewhat higher initial water-resistance, which is, however, considerably less than required commercially for a water-resistant coating or bond. A lesser quantity of the active compounds is necessary to impart the desired water-resistance to the deposited coatings or bonds when the relatively greater water-resistant emulsions are employed as a starting material. The age of the starting material emulsion also determines in part the susceptibility of the emulsion to waterproofing, the older emulsions, for example emulsions from four to six months old, show better water-resistance when treated than those freshly made.

For present purposes the polyvinyl acetate starting material emulsions having sufficient tack to be useful as quick-setting adhesives may be classified in three groups according to their initial water-resistance although in each instance the water-resistance is negligible from the standpoint of minimum commercial requirements. Such emulsions generally contain about 40-65% polyvinyl acetate by weight and a dried bond produced by the respective emulsions between two sheets of mildly calendered white sulphite paper will open up within 24 hours after immersion in water at about 25° C. Such emulsions include the commercially available emulsions known as Elvacet No. 80-900, Elvacet 81-900, Gelva S-50 and Polyco 117H, Polyco 117-SS and Polyco 289.

The physical characteristics of the commercially available polyvinyl acetate emulsions identified above may also vary to some extent as a result of the emulsifiers and bodying agents employed in producing the emulsions, and also as a result of particular plasticizers employed. In general, however, the variations which tend to increase the relative initial water-resistance of the starting material emulsions lessen the quantity of the active compounds required to effect complete water-resistance.

The amounts of active compound required to produce maximum water-resistance in a particular emulsion also varies with the quantity and the nature of the plasticizers, extenders, or other diluents which may be used to develop desired characteristics of fluidity or tackiness in the emulsion, or of flexibility, hardness, etc. in the coating or film deposited from the emulsion. In general, it has been found that the insoluble type of plasticizer and resins in common use increase the effectiveness of the active compounds, and that a lesser quantity of active compound is necessary to produce complete water-resistance when such plasticizers are also present in the emulsion. It should be noted, however, that in each instance the emulsion containing the plasticizers and various other diluents was not initially water-resistant and that the addition of the active compound was necessary to effect any satisfactory water-resistance although as related above, a lesser amount is necessary when insoluble plasticizers are also present.

This enhancing effect of the insoluble plasticizers was particularly observed with respect to dimethyl phthalate, dibutyl phthalate, chlorinated diphenyls, methyl abiatate and tributyl phosphate, and appears to be characteristic of other common plasticizers such as di-carbitol phthalate, dibutoxy-glycol phthalate, dimethoxy-glycol phthalate, butyl phthalyl butyl glycolate, methyl phthalyl ethyl glycolate, triglycol di-2-ethylbutyrate, triglycol di-2-ethylhexoate, tricresyl phosphate and triphenyl phosphate.

On the other hand, the presence of a small amount of certain water-soluble thickeners such as polyvinyl alcohol and sodium carboxymethyl cellulose tend to increase the amount of active compound necessary to effect maximum water-resistance.

In some instances care must be exercised to avoid breaking the emulsion by sudden heating, or by extending heating above the temperature specified. The critical temperature will vary, of course, with the character of the particular starting material emulsion employed.

Aging the composition also tends to increase the water-resistance of the coatings or films deposited therefrom.

It will be apparent from the foregoing that innumerable possibilties for formulating the instant water-resistance composition exist, and that the invention may be practiced to increase the water-resistance of any particular polyvinyl acetate emulsion without materially interfering with the versatility of the starting material emulsion.

The addition of the active compound to the starting material emulsion may result in a substantial increase in the viscosity of the emulsion to form a cohesive mass unless the active compound is added slowly with continuous agitation. In some instances rapid addition of the active compound results in localized precipitation of the emulsion. The largest part of the increased cohesiveness and viscosity of the emulsion caused by addition of the active compound at a suitable rate disappears on agitation, or when the treated emulsion is permitted to stand for a short period following the addition of the active compound.

In all of the following examples the composition was prepared by stirring the starting material emulsion with a high-speed mixer continuously during the addition of the active compound thereto. The active compound was introduced into the emulsion at the rate of about 3% of the total weight of the active compound per minute.

Each of several tacky starting material polyvinyl emulsions was applied as a coating on the surface of a moderately calendered and sized white sulphite paper and as a bond between two such papers. The films and bonds thus formed were allowed to dry for 24 hours at room temperature and were thereafter immersed in water at room temperature for 24 hours. Upon removal from the water the wet strength of the paper exceeded the bond strength in all cases, and the bond ruptured when the bonded papers were separated. The coatings in each instance had visibly disintegrated. These starting material emulsions were, therefore, considered non-water-resistant, and in the subsequent experiments, satisfactory water-resistance of a film or bond formed from an emulsion treated with an active compound was considered fully indicated when the strength of the bond exceeded the wet strength of the paper after 24 hours immersion.

*Example 1*

A sample was prepared by placing 550 parts of a polyvinyl acetate emulsion having about 55% solid content in a mixing container and stirring it with a high-speed mixer while 30 parts of a tributyl phosphate plasticizer were added thereto. A solution of 24 parts of benzamide in 40 parts of hot ethyl alcohol was added slowly to the mixture of emulsion and plasticizer while it was stirred continuously.

A second sample was prepared in the same manner except that the benzamide solution consisted of 15 parts of benzamide in 40 parts of hot ethyl alcohol.

A third sample was prepared by mixing 550 parts of a polyvinyl acetate emulsion having about 55% solid content with 30 parts of a tributyl phosphate plasticizer while the emulsion was stirred continuously with a high-speed mixer.

All three samples were tested for water-resistance by applying the samples as both a film and bond to a mildly sized and calendered white sulphite paper. The films and bonds were permitted to dry for 24 hours and were thereafter immersed in water at room temperature for 24 hours. The films and bonds deposited from the samples containing the benzamide were found to be continuous and intact after the 24 hour immersion, and the bond strength exceeded the wet strength of the paper so that the surface of the paper adhered to the bond when the papers were separated. The films and bonds deposited from the sample consisting of emulsion and plasticizer had visibly disintegrated during the period of immersion. The wet strength of the paper exceeded the strength of the bond and the bond fractured when the papers were separated.

*Example 2*

A set of three samples was prepared in the same manner as those described in Example 1 except that the benzamide was solubilized in about 70 parts of hot water in place of the hot ethyl alcohol employed in Example 1. The films and bonds deposited from these three samples were tested for waterproofness in the manner described in Example 1. The films and bonds deposited from the samples containing the benzamide were found to be water-resistant. The films were continuous and intact after the period of immersion and the bond strength exceeded the wet strength of the paper so that the paper was torn when the bonded papers were separated. The sample consisting of emulsion and plasticizer showed no water-resistance. The films had been redispersed during the period of immersion and the bonds fractured easily without tearing the bonded papers when the papers were separated.

It will be apparent that the water-resistant compositions formulated according to the instant invention will considerably extend the usefulness of aqueous emulsions of polyvinyl acetate into the field in which high water-resistance of the bond or coating deposited is necessary and will find application in bonding or cementing for cellulosic articles such as paper cups or paper bags which in the course of normal use are exposed to water and for bonding surfaces of cellulosic material to other surfaces of a hydrophilic character such as masonry. These compositions are particularly adapted for use as a sizing where water-resistance of the fabric or the paper to which it is applied is required. It may also be employed in the composition of printing paste, as a finish for paper, paper-board, or foils and in the manufacture of formed or impregnated goods, as well as distemper paints and the like.

Having thus described the invention, what is new and desired to be secured by Letters Patent is:

1. A composition comprising an aqueous emulsion of polyvinyl acetate, and from 5 to 15% by weight of said acetate of an unsubstituted aromatic amide containing 7 carbon atoms.

2. A composition comprising an aqueous emulsion of polyvinyl acetate, a plasticizer for said acetate and from 5 to 15% by weight of said acetate of an unsubstituted aromatic amide containing 7 carbon atoms.

3. A composition comprising an aqueous emulsion of polyvinyl acetate, and from 5 to 15% by weight of said acetate of benzamide.

4. A process for formulating an aqueous emulsion of polyvinyl acetate capable of depositing a water-resistant film upon evaporation of the water phase comprising the step of adding to an emulsion of polyvinyl acetate about 5–15% by weight of said acetate of an unsubstituted aromatic amide having 7 carbon atoms.

5. A base having a water resistant coating deposited thereon from a composition comprising an aqueous emulsion of polyvinyl acetate, and from 5 to 15% by weight of said acetate of an unsubstituted aromatic amide containing 7 carbon atoms.

6. A base having a water resistant coating deposited thereon from a composition comprising an aqueous emulsion of polyvinyl acetate, and from 5 to 15% by the weight of said acetate of benzamide.

WALTER G. KUNZE.
R. BERTRAM EVANS.

REFERENCES CITED

The following references are of record in the file of this patent:

UNITED STATES PATENTS

| Number | Name | Date |
|---|---|---|
| 2,098,538 | Charch et al. | Nov. 9, 1937 |
| 2,444,396 | Collins et al. | June 29, 1948 |